United States Patent [19]
Toth et al.

[11] 3,827,568
[45] Aug. 6, 1974

[54] FULL FLOW FLUID FILTER

[75] Inventors: Louis R. Toth, Montrose; Ray Hagler, Jr., Valencia; Orville F. Keller, La Canada, all of Calif.

[73] Assignee: California Institute of Technology, Pasadena, Calif.

[22] Filed: Jan. 12, 1973

[21] Appl. No.: 323,279

[52] U.S. Cl................. 210/448, 210/457, 210/488
[51] Int. Cl...................... B01d 27/00, B01d 25/18
[58] Field of Search .......... 210/435, 437, 448, 457, 210/488

[56] References Cited
UNITED STATES PATENTS
| | | | |
|---|---|---|---|
| 2,581,337 | 1/1952 | Lapik............................. | 210/488 X |
| 2,670,851 | 3/1954 | Curtis............................. | 210/435 |
| 3,151,071 | 9/1964 | Kasten........................... | 210/488 X |
| 3,397,794 | 8/1968 | Toth et al. ..................... | 210/488 |

*Primary Examiner*—Charles N. Hart
*Assistant Examiner*—Richard W. Burks
*Attorney, Agent, or Firm*—Harris, Kern, Wallen & Tinsley

[57] ABSTRACT

A filter for removing particulate impurities from a fluid comprising a hollow, generally cylindrical housing having axial fluid channels along the inner surface and open opposite ends forming an inlet and an outlet for the filter. A plurality of annular, generally disc-shaped filter elements are tightly stacked within the housing. Outer edges of the filter elements bear on the inner surface of the housing and combine to form the axial fluid channels while inner edges of the filter elements combine to form a hollow inner core communicating with one of the open ends of the housing. Each filter element includes a plurality of radial channels between the axial channels and the hollow inner core and each channel includes means defining a low-velocity pocket for trapping particulate impurities in a fluid flowing therealong. One end of the hollow inner core is blocked such that the path for fluid flowing between the inlet and outlet is through the axial and radial channels and the hollow inner core.

9 Claims, 7 Drawing Figures

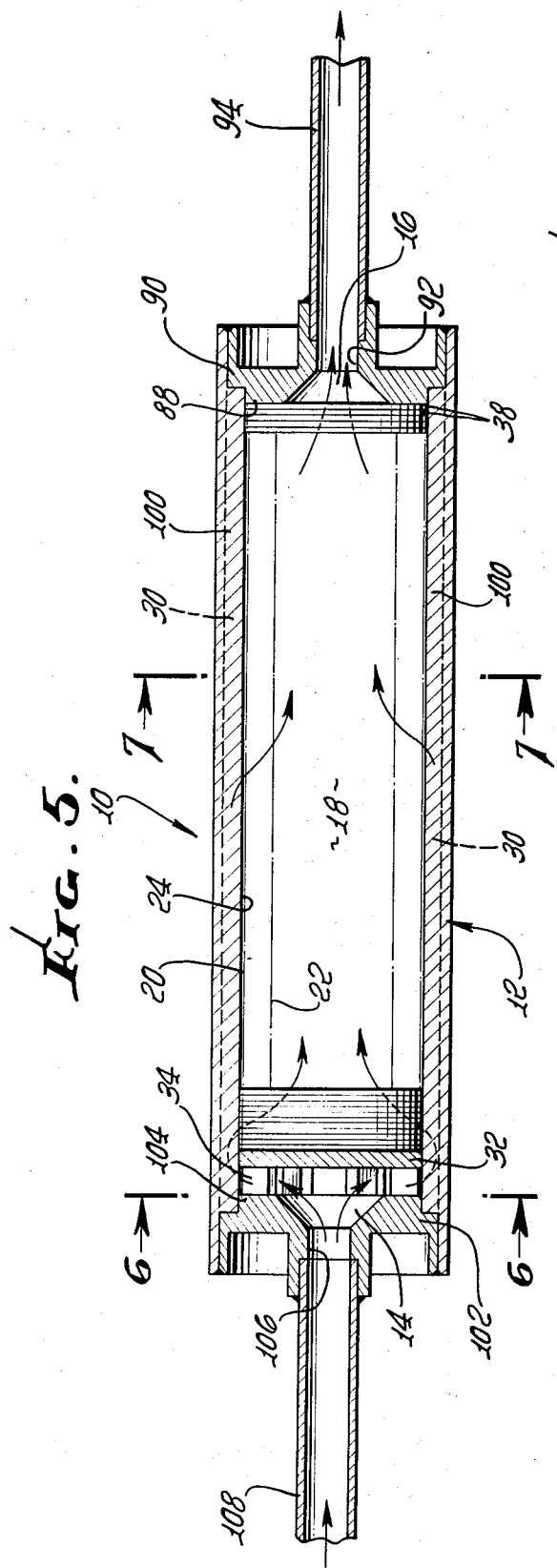
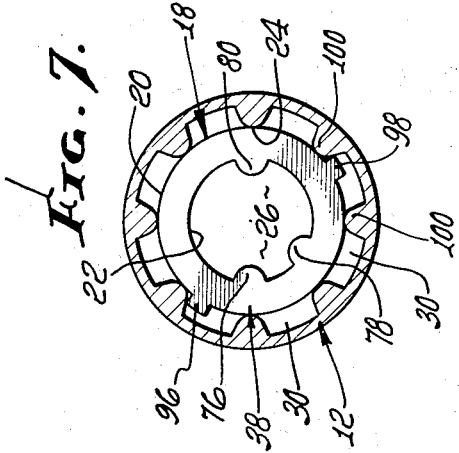
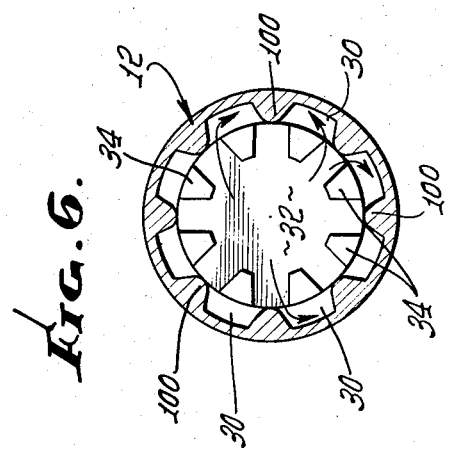
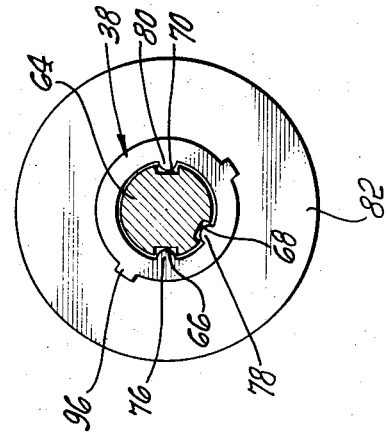

FULL FLOW FLUID FILTER

The present invention relates to devices for filtering impurities and particulate matter from a fluid stream and more particularly to an improved fluid filter for removing particulate impurities by inertial separation.

In many fluid systems, it is desirable or necessary to remove particulate impurities from a fluid without noticeably lowering the pressure of the fluid. In the past, this has been a severe problem since nearly all devices for filtering and removing such impurities include fluid restrictions which introduce a substantial pressure drop in the associated fluid line.

Accordingly, it is an object of the present invention to provide a device for effectively removing particulate impurities from a fluid without introducing unnecessary pressure drop in the fluid line to which it is connected.

Another object of the present invention is to provide such a filter device which is simple in construction and which may be easily assembled.

A further object of the present invention is to provide a fluid filter of the foregoing character including a cylindrical filter in a hollow housing, the housing including axial fluid channels along the inner surface and open opposite ends forming an inlet and an outlet for the filter, the cylindrical filter being supported on the inner surface of the housing and including a plurality of radial channels between the axial channels and a hollow inner core formed by an inner surface of the filter and communicating with one of the open ends of the housing to provide a fluid path between the inlet and outlet through the axial and radial channels and the hollow inner core.

Still another object of the invention is to provide a fluid filter of the foregoing character wherein each radial channel includes means defining a low-velocity pocket for trapping particulate impurities flowing therealong through said filter between said inlet and outlet.

A still further object of the present invention is to provide a fluid filter of the foregoing character wherein the cylindrical filter is formed of a stack of thin, annular, generally disc-shaped filter elements each having a plurality of circumferentially-spaced, radial channels on the back face thereof.

The foregoing as well as other objects and advantages of the present invention may be more clearly understood by reference to the following detailed description when considered with the drawings which, by way of example only, illustrate a fluid filter, the components thereof and their manner of fabrication, all embodying features of the present invention.

In the drawings:

FIG. 4 is a cross-sectional view taken along the line 4—4 in FIG. 3 illustrating the manner in which the disc-shaped filter elements are oriented front-to-back and circumferentially indexed on the mandrel;

FIG. 5 is a longitudinal sectional view through the fluid filter having the cylindrical filter mounted within the housing;

Figure 1:
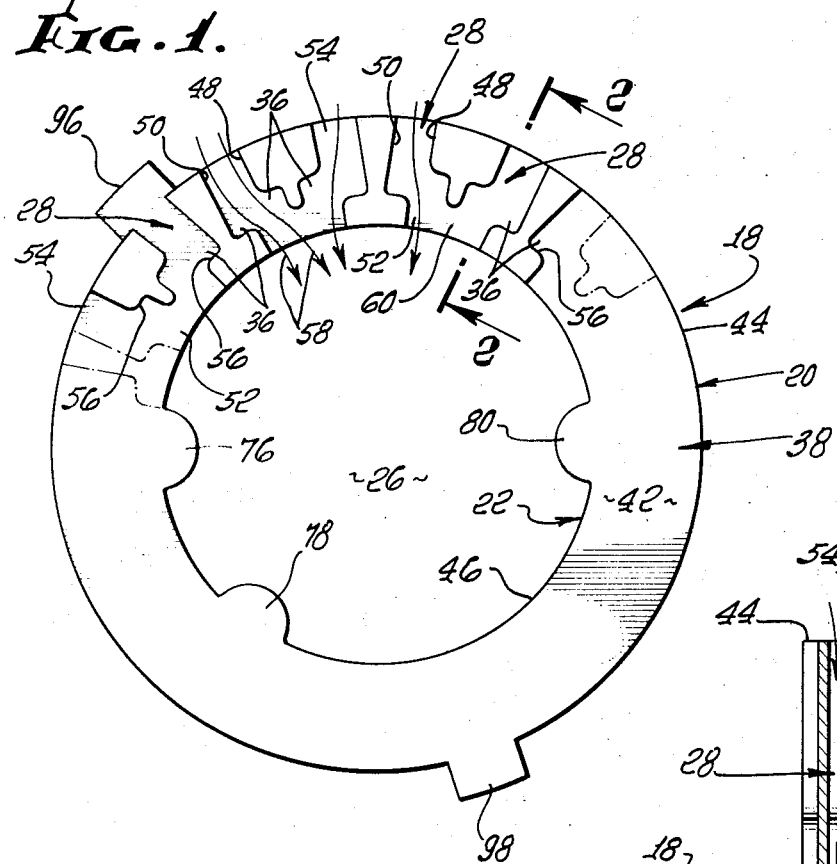
FIG. 1 is an enlarged end view of the cylindrical filter included in the illustrated form of the fluid filter of the present invention, the cylindrical filter comprising a stack of thin, annular, disc-shaped filter elements and FIG. 1 showing the back face of one of the filter elements having a preferred pattern of radial channels etched therein.

FIG. 6 is a cross-sectional view taken along the line 6—6 in FIG. 5 showing one end of a partition member for deflecting fluid from the fluid inlet for the filter to a plurality of axial channels along the inner surface of the housing; and FIG. 7 is a cross-sectional view taken along the line 7—7 in FIG. 5 illustrating the positioning of the cylindrical filter within the housing with indexing tabs engaging certain of the axial channel walls to circumferentially index the cylindrical filter within the housing.

Basically, to accomplish the foregoing objects, the fluid filter 10 of the present invention includes a hollow, generally cylindrical housing 12 having open opposite ends forming a fluid inlet 14 and a fluid outlet 16. A cylindrical filter 18 is mounted within the housing 12 and includes a generally cylindrical outer surface 20 and a generally cylindrical inner surface 22. The outer surface 20 engages and is supported on an inner surface 24 of the housing while the inner surface of the cylindrical filter defines an axial hollow inner core 26 communicating with one of the open ends of the housing, here the outlet 16. The cylindrical filter 18 includes a plurality of axially-spaced, radial channels 28 between the outer surface 20 and the hollow inner core 26 for passing fluid between a plurality of axial channels 30 along the inner surface of the housing and the inner core. The end of the cylindrical filter 18 adjacent the inlet 14 is blocked by a partition 32 including deflecting members 34 for directing fluid from the inlet outwardly to the axial channels 30. Thus, fluid flowing in the inlet 14 is directed to and along the axial channels 30 and then inwardly via the radial channels 28 to the hollow inner core 26 and out the outlet 16. Each radial channel 28 provides an open, substantially unrestricted fluid path and is shaped to include a low-velocity pocket 36 at a side wall thereof. Each pocket 36 is designed to trap by inertial separation particulate impurities contained in the fluid flowing through the associated channel. Accordingly, because of the open, substantially unrestricted flow path defined by the radial channels 28, fluid may flow rapidly through the cylindrical filter 18 with only a very small pressure drop. At the same time, the fluid is cleansed of particulate impurities which are trapped in the pockets 36.

Figure 2:
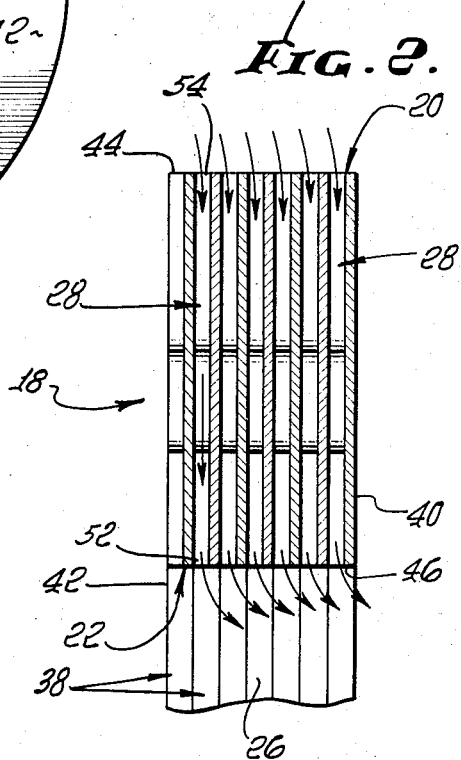
FIG. 2 is a fragmentary sectional side view of a portion of the cylindrical filter of FIG. 1, the view being taken along the line 2—2 in FIG. 1 and showing the disc-shaped filter elements stacked front-to-back against each other with the radial fluid channels formed therein.

More particularly, the cylindrical filter 18 illustrated in FIGS. 1, 2, and 5 comprises a plurality of annular, generally disc-shaped, metallic filter elements 38 circumferentially indexed in a fluid-tight stack mounted axially in the housing 12. Each filter element 38 includes a front face 40, a back face 42, and outer and inner annular edges 44 and 46. In the stack of filter elements 38, the outer edges 44 define the outer surface 20 of the cylindrical filter while the inner edges 22 define the inner surface 24 and the hollow inner core 26. The radial channels 28 in the cylindrical filter are a plurality of circumferentially-spaced, radially-extending fluid channels formed as by etching on the back face 42 of each filter element 38. Each channel 28 includes right and left side walls 48 and 50, inner and outer open ends 52 and 54 at the inner and outer edges of the filter element, and means defining at least one of the low-velocity pockets 36. In the stack, the front face of adjacent filter elements closes the open face of the channels to provide a fluid-tight separation between the adjacent filter channels.

Preferably for each radial channel 28, a portion of the outer open end 54 is radially in line with and open to a portion of the inner open end 52 thereof. This means that there is an open radial path for direct fluid flow through the channels 28 from the axial channels to the hollow inner core. Also, the pockets 36 are preferably formed by a bend or bends or other suitable smooth projections in each channel forming a shoulder or shoulders 56 facing fluid flowing therein. In the form illustrated in FIG. 1, each channel 28 includes a series of two opposite, substantially right-angle bends defining two pockets 36 and a shoulder 56 facing fluid flow in the direction indicated by the arrows 58. Further, alternate channels 28 are mirror images of each other to define a series of pairs of mirror-image channels and a portion of the right and left side walls 48 and 50 of each pair of mirror-image channels is relieved at the open inner end thereof to define an enlarged common open inner end 60 for each pair.

In such a channel arrangement, fluid entering the outer open ends 54 of the channels 36 flows radially inward toward the first right-angle bend and shoulder 56. In that region, the direction of fluid flow bends approximately 90° and then immediately rebends 90° at the second right-angle bend, the fluid then exiting at the enlarged inner open end 60. While the fluid readily follows the above described bending path, particulate impurities possess a greater mass and inertia and upon entering the first bend tend to travel straight into the first low-velocity pocket 36 and to be trapped therein. The particulate impurities escaping the first pocket 36 are swept with the fluid in the direction of the second bend. Again because of their mass and inertia, the escaping particulate impurities flow straight into the second low-velocity pocket 36 and are trapped therein leaving the fluid exiting from the open end 60 substantially free of particulate impurities.

Figure 3:
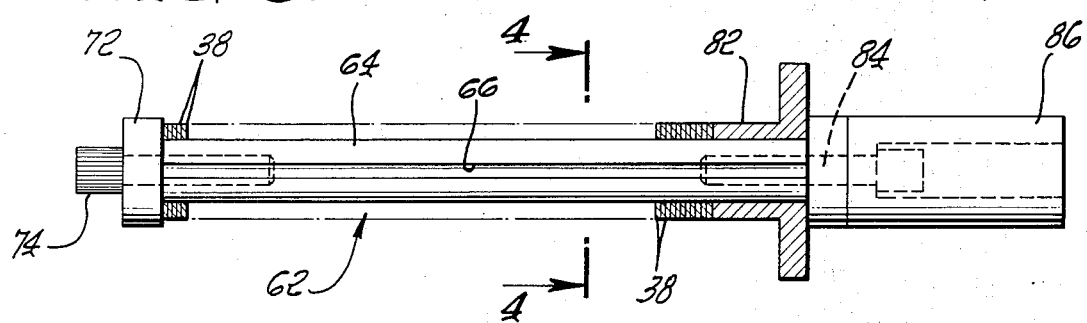
FIG. 3 is a longitudinal sectional side view of a mandrel for fabricating the cylindrical filter of FIGS. 1 and 2 and for introducing the cylindrical filter into a housing of the fluid filter.

To provide the desired stacking, indexing, and abutting relationship for the filter elements 38 in the cylindrical filter, and to provide for a rapid and simple assembly of the fluid filter 10, the present invention contemplates a method of assembly including a mandrel 62 having a shape substantially as illustrated in FIGS. 3 and 4. As shown, the mandrel 62 comprises an elongated shaft 64 including three circumferentially-spaced, axial grooves 66, 68, and 70 extending the length thereof. An end plate 72 is releasably secured to one end of the shaft by a screw connector 74 and acts as an end stop or retainer for filter elements 38 on the shaft. In this regard, and as shown most clearly in FIG. 4, the inner edge 46 of each filter element includes three circumferentially-spaced, radially-extending lobes 76, 78, and 80 for riding along the axial grooves 66, 68, and 70 in the shaft 64. Thus, to mount the filter elements 38 on the shaft 64, one removes the end plate 72 and slips a filter element over the end of the shaft and slides it toward an insertion collar 82. The insertion collar 82 is releasably secured on the shaft by a screw connector 84 secured to the end of the shaft and carrying a handle 86 for bearing against an end of the collar. This operation is repeated for each filter element to form a stack of filter elements axially and circumferentially indexed on the shaft. Once the filter elements 38 are all mounted on the shaft 64, the end plate 72 is again secured on the shaft with an end thereof butting against the endmost filter element in the stack.

With the filter elements 38 thus stacked and axially and circumferentially indexed on the mandrel 62, the end plate 72 is removed and the end of the mandrel opposite the insertion collar 82 inserted into the inlet of the housing 12. The filter elements 38 are shaped and dimensioned such that the outer edges 44 thereof ride on the inner surface of the housing until the endmost filter element 38 engages an annular shoulder 88 defined by an end cap 90 welded in the outlet of the housing and including a central port 92 for connecting to an outlet pipe 94 from the fluid filter 10.

As shown in FIGS. 1, 4, and 7, each filter element 38 includes two circumferentially-spaced, radially-extending indexing tabs 96 and 98. The indexing tabs are designed to fit in the axial channels 30 and to engage side walls of particular ones thereof. Thus, in inserting the mandrel 62 into the inlet end of the housing 12, care is taken to insure that the indexing tabs 96 and 98 ride in corresponding ones of the axial channels, all of which are preferably formed by axially extending ribs 100 on the inner surface of the housing. When the mandrel 62 is fully inserted into the housing 12, the endmost filter member 38 bears on the annular shoulder 88. As shown most clearly in FIG. 7, the sides of the indexing tabs 96 and 98 bear against opposite side walls of corresponding axial channels to preclude disc rotation. Thus mounted, the stack of filter elements is circumferentially indexed within the housing and axially aligned such that the radial channels 28 lie in common axial planes to provide a minimum restriction to fluid flow through the fluid filter 10.

Once the cylindrical filter 18 is circumferentially indexed within the housing, the mandrel 62 is slipped from the housing 12 leaving the cylindrical filter 18 in place. The partition 32 is then inserted in the inlet end of the housing to bear tightly against the exposed filter element. By exerting pressure on the partition 32, the filter elements are urged tightly together to produce the previously referred to fluid-tight seal. The partition 32 supports the plurality of circumferentially-spaced, axially-extending deflectors 34 for deflecting fluid entering the inlet 14 radially outward to the axial channels 30, as indicated by the arrows in FIGS. 5 and 6.

With the partition 32 in place, an end cap 102 is positioned in the inlet 14 and welded to the housing with an annular shoulder 104 bearing tightly against the deflectors 34. The end cap 102 includes a central port 106 for receiving an inlet pipe 108 for directing fluid into the fluid filter 10 to follow the fluid path indicated by the arrows in FIG. 5. That is, fluid entering the inlet 14 is forced outwardly by the deflectors 34 into and along the axial channels 30. From the axial channels 30, the fluid flows inwardly along the radial channels 28 to the hollow inner core 26 and out the outlet 16. In so traveling, the fluid is passed along a relatively open and unrestricted fluid path which does not noticeably retard the velocity of the fluid and only introduces a very small pressure drop into the fluid line. While the fluid is flowing through the radial channels 28, particulate impurities are trapped by inertial separation, as previously described to produce an impurity-free fluid at the outlet of the filter.

While a particular form of fluid filter and method of assembly have been described herein, changes and modifications may be made therein without departing from the spirit of the invention. For example, the fluid inlet and outlet may be reversed to provide fluid flow from the hollow inner core radially outward through the radial channels to the axial channels and hence to the inlet. The radial channels are preferably shaped as shown in FIGS. 1 and 2 to provide the desired trapping of particulate impurities by inertial separation upon such a reversal of fluid flow by trapping of the impurities in the pockets 36.

In view of the foregoing as well as other changes that may be made in the invention described herein, it is intended that the present invention be limited in scope only by the terms of the following claims.

We claim:

1. A fluid filter for removing particulate impurities from a fluid by inertial separation, comprising:
   a hollow generally cylindrical housing having open opposite ends defining a fluid inlet and a fluid outlet for said filter;
   circumferentially-spaced axial fluid channels along an inner surface of said housing;
   cylindrical filter means mounted in said housing and including a stack of annular, generally disc-shaped elements each having a front face, a back face, outer and inner annular edges and a plurality of circumferentially-spaced, radially-extending fluid channels on said back face, each radially-extending channel including right and left side walls, outer and inner open ends at said outer and inner edges, a portion of said outer open end being radially in line with and open to a portion of said inner open end, and means defining a pocket along a side wall for trapping impurities in a fluid flowing through said filter element along said radially-extending channels, said outer annular edges combining to define an outer surface for said filter means supported on said inner surface of said housing, and said inner annular edges combining to form an inner surface defining an axially extending hollow inner core for said filter for communicating with one of said open ends of said housing; and
   means in another of said open ends of said housing for blocking an end of said hollow inner core whereby the path of fluid flowing between said inlet and said outlet of said filter is through said axial and radial channels and said hollow inner core.

2. The fluid filter of claim 1 wherein each disc-shaped element includes a similar indexing means for engaging side walls of certain of said axial channels to circumferentially align all of said elements within said housing.

3. A method of assemblying a plurality of annular, generally disc-shaped filter elements in a hollow cylindrical housing of a fluid filter comprising:
   stacking said filter elements one-by-one on an elongated mandrel and against a stop element extending therefrom with a lobe radially extending from an inner edge of each element riding along axially extending slots in said mandrel to axially and circumferentially index said filter elements on said mandrel;
   inserting said mandrel with said filter elements stacked thereon into an open end of said cylindrical housing until all of said filter elements are in said housing with an outer edge of each element bearing on an inner surface of said housing and tabs extending radially from the outer edge of each said filter element contacting opposite side walls of two of a plurality of axial channels on an inner surface of said housing to circumferentially index said filter elements in said housing; and
   withdrawing said mandrel from said elements leaving said filter elements mounted in said housing.

4. A fluid filter element for removing particulate impurities from a fluid by inertial separation, comprising:
   an annular, generally disc-shaped element having a front face, a back face, and outer and inner annular edges; and
   a plurality of circumferentially-spaced, radially-extending fluid channels on said back face, each channel including right and left side walls, outer and inner open ends at said outer and inner edges, a portion of said outer open end being radially in line with and open to a portion of said inner open end, and means defining a pocket along a side wall for trapping impurities in a fluid flowing through said filter element along said channels.

5. The fluid filter element of claim 4 wherein said pocket-defining means comprises a bend in each channel forming a circumferentially extending shoulder terminating at one of said open ends of said channel and facing fluid flowing radially therein.

6. The fluid filter element of claim 4 wherein said pocket-defining means comprises a series of two opposite substantially right angle bends in each channel.

7. The fluid filter element of claim 6 wherein alternate channels are mirror images of each other to define a series of pairs of mirror-image channels.

8. The fluid filter of claim 7 wherein a portion of adjacent right and left side walls of each pair of mirror-image channels is relieved at said open inner end thereof to define an enlarged common open inner end for each said pair.

9. A fluid filter element for removing particulate impurities from a fluid by inertial separation, comprising:
   an annular, generally disc-shaped element having a front face, a back face and outer and inner annular edges; and
   a plurality of circumferentially-spaced, radially-extending fluid channels on said back face, each channel including right and left side walls, outer and inner open ends at said outer and inner edges, and means defining a pocket along a side wall for trapping impurities in a fluid flowing through said filter element and radially along said channel, said pocket defining means comprising a bend in said channel forming a circumferentially-extending shoulder terminating at one of said open ends of said channel and facing fluid flowing radially therein.

* * * * *